UNITED STATES PATENT OFFICE.

ALBERT C. DUNG, OF NEW YORK, N. Y.

IMPROVEMENT IN COMPOSITIONS FOR DENTIFRICE.

Specification forming part of Letters Patent No. 164,433, dated June 15, 1875; application filed April 8, 1875.

*To all whom it may concern:*

Be it known that I, ALBERT C. DUNG, of New York, in the county of New York and State of New York, have invented a new and Improved Composition for Dentifrice, of which the following is a specification:

The invention relates to a new composition for effectually destroying the minute vegetable and other impurities that settle on or near the teeth.

The invention consists in compounding salicylic acid with orris root and abrading substance, as will hereinafter be more fully described.

The antiseptic properties of salicylic acid have but lately been discovered. Like carbolic acid it destroys the germs of fermentation and decay, and all lower organisms, both of vegetable and animal origin, such as fungi and miasma, but it differs from carbolic acid inasmuch as it is not poisonous, and because perfectly inodorous. Another advantage of the salicylic acid over carbolic acid is that the former does not destroy the tender animal membranes, such as the mucous membrane, epidermis, &c. These properties of the salicylic acid make it specially fit for use in compositions for dentifrice, such as tooth-powders and tooth-washes, as the teeth will thereby be kept clean from all slimy substances, the gum of the teeth and the tongue as well as the mucous membrane of the throat and mouth will be protected against fungi and miasms, thereby preventing and eventually curing diseases which have their origin in the mouth—as, for example, scurvy, aphthæ, and diphtheria. Salicylic acid, forming part of a liquid or powdered dentifrice, besides preventing the above and other diseases, will also aid in keeping the teeth clean and healthy, and will never prove injurious.

The following is my composition for dentifrice: I take one part of salicylic acid that has been finely triturated, and mix the same with about eight parts of finely-pulverized orris root, and add about eight parts of finely-powdered pumice-stone and about eighty parts of precipitated carbonate of lime, the latter two ingredients serving as abrading materials. The ingredients are well mixed, and will constitute an excellent dentifrice. If it is desired to have the dentifrice in liquid form I substitute for the powdered abrading material spirit of soap, which also constitutes an excellent abrading material—that is to say, I digest one ounce of orris root in coarse powder with fourteen ounces of pure alchohol. After three days about I filter and add about two ounces of spiritus saponatus. In this liquid I dissolve about forty-eight grains of pure salicylic acid. The spiritus saponatus in this mixture constitutes the abrading substance.

I claim as my invention—

The composition of salicylic acid, orris root, and abrading material, substantially in the proportions specified.

ALBERT C. DUNG.

Witnesses:
   A. V. BRIESEN,
   E. C. WEBB.